(12) United States Patent
Mercey et al.

(10) Patent No.: US 8,714,615 B2
(45) Date of Patent: May 6, 2014

(54) MOTOR VEHICLE INTERIOR STRUCTURE HAVING A DOOR WITH IMPEDED MOVEMENT, AND DASHBOARD AND MOTOR VEHICLE EQUIPPED WITH THE SAME

(75) Inventors: Nicolas Mercey, Champagne sur Oise (FR); Guillaume Malatre, Aillevans (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/403,750

(22) Filed: Feb. 23, 2012

(65) Prior Publication Data

US 2013/0043699 A1    Feb. 21, 2013

(30) Foreign Application Priority Data

Feb. 24, 2011  (FR) ...................................... 11 51505

(51) Int. Cl.
    *B60R 7/06*    (2006.01)
(52) U.S. Cl.
    USPC ...................................... 296/37.12
(58) Field of Classification Search
    USPC ............................................ 296/37.12, 37.1
    See application file for complete search history.

(56) References Cited

U.S. PATENT DOCUMENTS 5,971,514 A * 10/1999 Hayakawa ................. 312/319.2
6,152,512 A * 11/2000 Brown et al. ............... 296/37.12

FOREIGN PATENT DOCUMENTS

| DE | 19921208 C1 | 8/2000 |
| DE | 202005015333 U1 | 2/2007 |
| EP | 1431123 A1 | 6/2004 |

OTHER PUBLICATIONS

French Search Report for FR application No. 1151505, dated Nov. 30, 2011, 2 pages.

* cited by examiner

*Primary Examiner* — Dennis Pedder
(74) *Attorney, Agent, or Firm* — Reising Ethington P.C.

(57) ABSTRACT

A motor vehicle interior structure comprises a receptacle having an opening; a door for covering the opening; a pivot connection of the door to the receptacle for movement around a first axis of rotation; and a member for impeding the displacement of the door. The member includes a movable piston carried by a body that is attached to the receptacle. The structure further includes a link pivotally mounted on the receptacle and interconnecting the piston and door via first and second connecting points, respectively. The link pivots about a second axis of rotation and the first and second connecting points are located relative to the second axis of rotation so that a rotary movement in the counter-clockwise direction of the first connecting point around the first axis of rotation drives the second connecting point into rotation around the second axis of rotation in the clockwise direction.

12 Claims, 3 Drawing Sheets

MOTOR VEHICLE INTERIOR STRUCTURE HAVING A DOOR WITH IMPEDED MOVEMENT, AND DASHBOARD AND MOTOR VEHICLE EQUIPPED WITH THE SAME

TECHNICAL FIELD

The invention generally relates to impeding the pivoting of glove box doors or other receptacle doors in a motor vehicle interior structure.

BACKGROUND

DE 19921208 describes a motor vehicle interior structure of the type comprising a receptacle having an opening, a door for covering the opening and being pivotally mounted so as to pivot the door about a first axis of rotation between a position that covers the opening and a position that permits access to the receptacle through the opening. The structure includes a member that impedes movement of the door, the member including a body and a piston that moves relative to the body. The structure further includes a pivoting lever connecting the piston to the door, this lever being laid out so as not to cause elongation of the impeding member at the beginning of the travel for opening the door.

When the interior structure is a glove box, the impeding member is implanted with its piston rod pointing towards the rear of the vehicle. The body is, as for it, moved quite far away towards the front of the vehicle. For certain configurations of the glove box, it is not possible to attach the body to the receptacle, since there is no wall available for this purpose nearby.

SUMMARY

Within this context, an object of the invention is to provide a structure of the type described above, that allows placement of the body of the impeding member in an area where it is easier to make the connection to the receptacle.

In accordance with one embodiment of the invention, there is provided a receptacle, a door that pivots about the first axis of rotation to selectively open and close the receptacle, and an impeding member as mentioned above, characterized in that the impeding member is interconnected to the door via a link between the piston and the door, the link having a lever pivotally mounted on the receptacle for movement around a second axis of rotation and being connected through first and second connecting points to the door and to the piston respectively. The first and second connecting points are located relative to the second axis of rotation so that a movement of rotation in the counter-clockwise direction of the first connecting point around the first axis of rotation causes the second connecting point to rotate around the second axis of rotation in the clockwise direction.

Thus, the lever is designed for inverting the direction of rotation of the second connecting point.

When the door moves from its closed or covering position to its opening or clearing position, it causes the first connecting point to rotate around the first axis of rotation, this rotation being expressed by a displacement of the first connecting point in the same direction as the door. For example, with reference to FIG. 3, in the case when the receptacle is a glove box made in the dashboard 110 of a motor vehicle 100, the door and the first connecting point move along a general direction towards the rear of the vehicle.

On the contrary, because of the layout of the lever, the second connecting point moves in the opposite direction of the first connecting point, i.e. along a general direction opposite to that of the second connecting point and of the door. In the case of the dashboard above, the second connecting point moves towards the front of the motor vehicle. Thus, the piston is driven relatively to the body in the opposite direction. In the example above, the piston is driven towards the front of the vehicle.

It is then possible to attach the body of the impeding member in proximity to the opening of the receptacle, i.e. in an area where it is generally possible to find a free wall for attaching the impeding member. Such a layout allows incorporation of impeding members on receptacles with small depths, which contributes to increasing the quality perceived by the passenger of the vehicle. The structure according to the invention provides an additional possibility for accommodating an impeding member on the receptacle.

As indicated above, the interior structure is typically a glove box closed by a pivoting door, integrated into the dashboard. Alternatively, the interior structure may be integrated to another element of the motor vehicle: a trim of a side opening frame of the vehicle, a central console, the back of a seat, etc.

The first and second axes of rotation are typically parallel to each other or substantially parallel to each other.

Preferably, the door moves from its closed position to its open position according to a downward rotation. Thus, the door is driven towards its open position by its own weight, the impeding member being provided for impeding this movement.

In this case, the first axis of rotation is placed so that a lower edge of the door is connected to a lower area of the receptacle, for example at the bottom of the receptacle.

Apart from that described above, the door pass from its closed position to its open position by any kind of movements: upwards, sideways by rotating around a vertical axis etc. When the door moves towards its open position with an upward movement, the impeding member may be provided in order to slow down the displacement of the door as it moves from its closed position to its open position, but conversely from the open position to the closed position.

In some embodiments, the lever may be directly mounted to the door through the first connecting point. Alternatively, it is attached to the connecting door via a small connecting rod or any other transmission member. Also, typically, the lever is directly connected to the piston through the second connecting point. Alternatively, the lever is connected to the piston by a small connecting rod, or any other type of transmission members.

Typically, the first connecting point includes an oblong hole or slot into which a pivot is engaged so as to slide freely. For example, the slot is made in the lever, the pivot being borne by the door. The pivot is for example a lug formed on an arm of the door. Alternatively, the slot may be made in the door, the pivot being borne by the lever, and being typically a lug formed on the lever.

For example, the lever may have first and second ends connected to the door and to the piston through the first and second connecting points respectively. The lever is in this case attached to the receptacle by an intermediate central area between the first and second ends.

The lever is typically bent or angled, and has two branches connected to each other through a bend. The first and second connecting points attach the ends of the arms opposite to the bend, to the door and to the piston respectively. The bend is attached to the receptacle through the second pivot connection.

The lever may have any kind of other shapes depending on the geometry of the receptacle, of the door and on the respective positions of the first and second axes of rotation.

The second connecting point is typically a pivot connection around an axis substantially parallel to the first and second axes of rotation. Also, the first connecting point may be a sliding pivot, the pivot being substantially parallel to the first and second axes of rotation.

According to a second aspect, the invention deals with a motor vehicle dashboard, comprising an interior structure having the above features.

According to a third aspect, the invention deals with a motor vehicle including an interior structure having the above features.

Further, the piston is preferably movable relative to the body between a sunken position in the body and a deployed position out of the body, the piston moving from the sunken position to the deployed position according to a movement towards the front of the vehicle. This allows attachment of the body of the impeding member to an area of the receptacle close to the opening.

Typically, the piston in its sunken position in the body is entirely facing a side wall of the receptacle and does not protrude beyond a front wall of the receptacle turned towards the front of the vehicle. As described later on, with this, it is possible to reduce the risk that the impeding member be damaged upon mounting the interior structure.

BRIEF DESCRIPTION OF THE DRAWINGS

Other features and advantages of the invention will become apparent from the detailed description which is given thereof below, as an indication and by no means as a limitation, with reference to the appended figures, wherein.

DESCRIPTION OF THE ILLUSTRATED EMBODIMENT(S)

Figure 1:
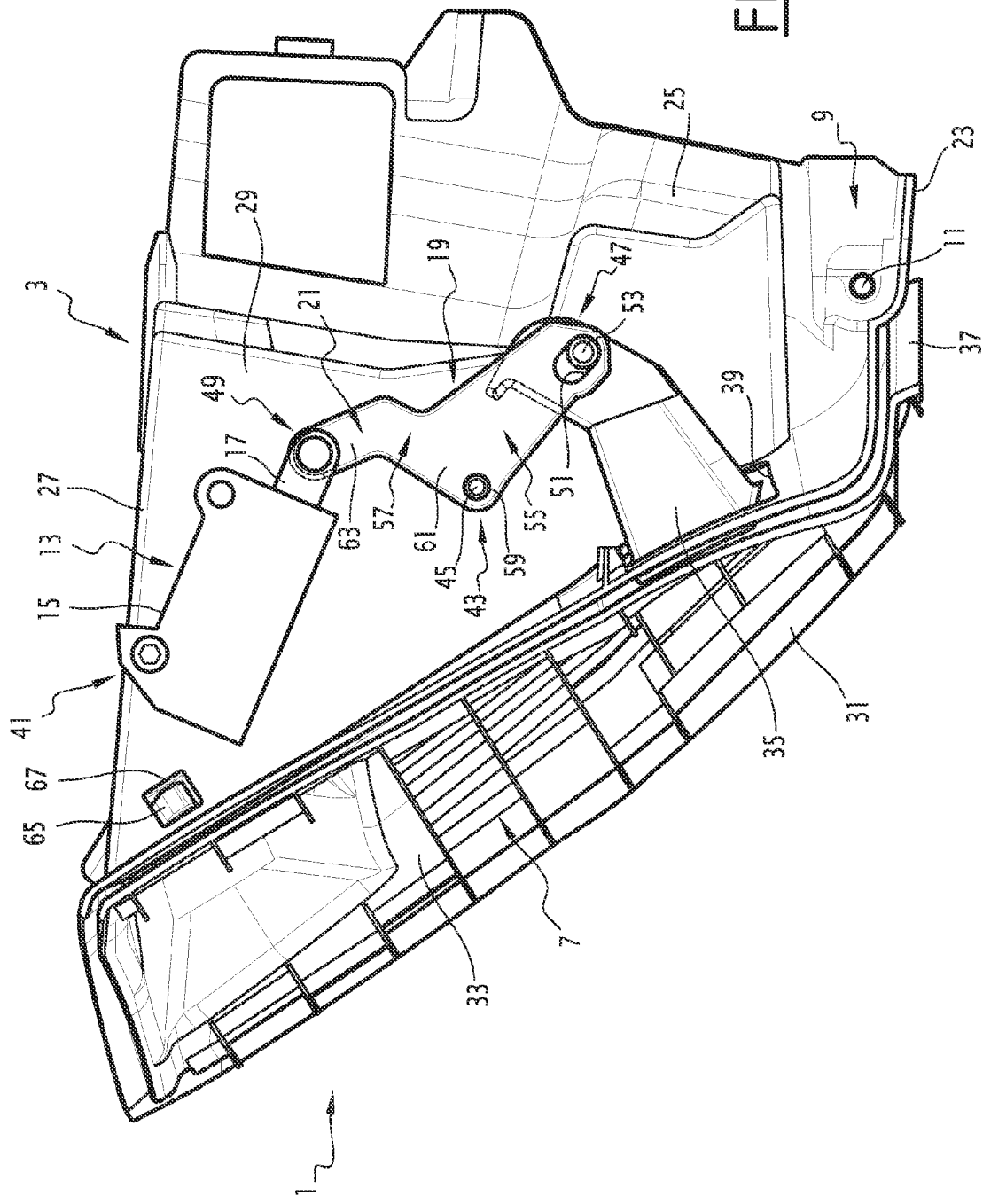
FIG. 1 is a simplified side view of a glove box according to the invention, intended to be incorporated into a motor vehicle dashboard, the glove box having a door being illustrated in its closed, or covering, position.
Figure 2:
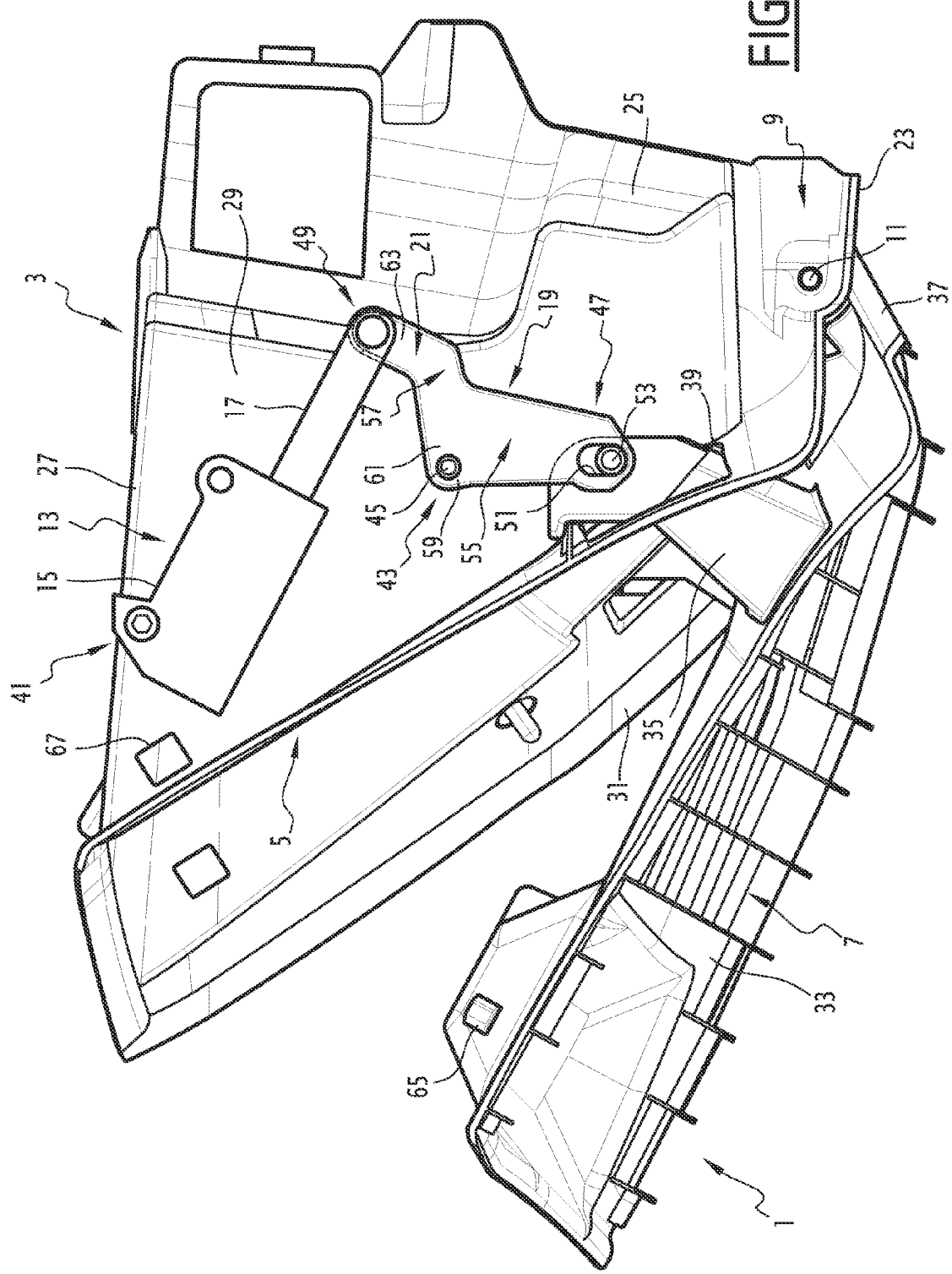
FIG. 2 is a view similar to that of FIG. 1, the door being illustrated in its open position.
Figure 3:
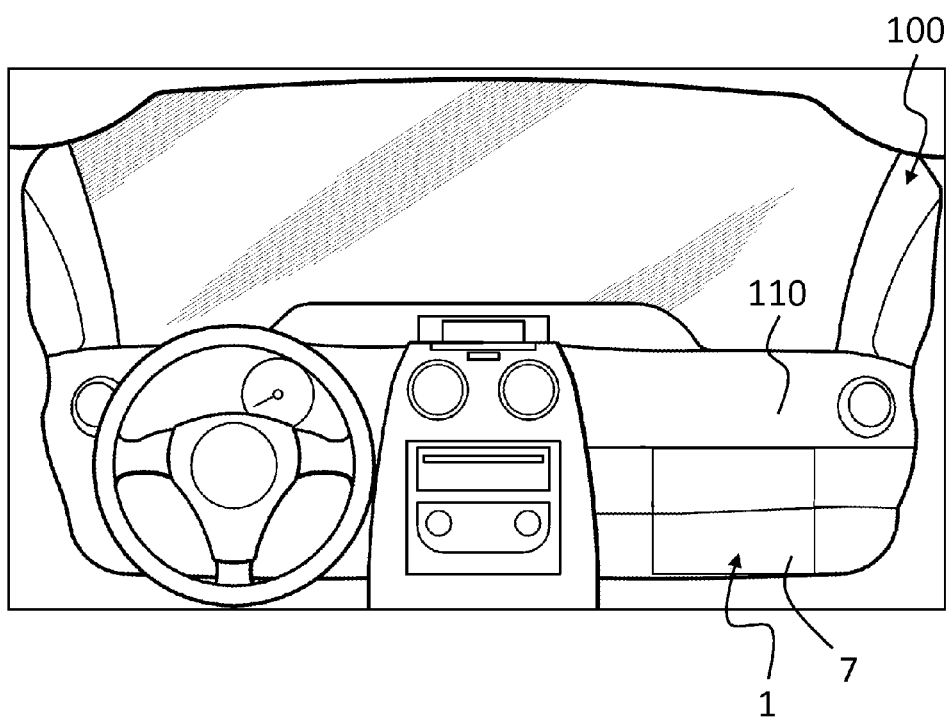
FIG. 3 is the interior of a motor vehicle equipped with a dashboard that includes a glove box such as that of FIG. 1 illustrated in the closed position.

The motor vehicle interior structure 1 illustrated in FIGS. 1 and 2 includes a receptacle 3 for receiving and storing accessories such as gloves, maps, disks, etc. via an access opening 5 in the receptacle, and a door 7 for selectively covering and uncovering the access opening 5 of the receptacle. The door 7 is pivotally mounted by a journal connection 9 for rotation relative to the receptacle 3 around a first axis of rotation 11. This permits the door 7 to pivot between a closed, or covering, position that blocks access into the receptacle, and an open, or clearing, position that provides access to the receptacle via the opening 5. The structure 1 includes an impeding member 13 such as one of the type that includes a body 15 and piston 17 carried by the body and movable relative to the body. The structure 1 further includes a link 19 that interconnects the piston 17 and the door 7. The impeding member 13 may have its body 15 mounted to the receptacle such that, via link 19, the impeding member 13 will operate to impede or otherwise slow down the displacement of the door 7 when moving between open and closed positions. The vehicle interior structure can be, for example, a glove box incorporated into the vehicle such that the access opening 5 faces towards the rear of the vehicle.

The receptacle 3 may be formed from plastic material by injection molding or otherwise. It includes a bottom 23, a front wall 25 turned towards the front of the vehicle and opposite to the opening 5, an upper wall 27 opposite to the bottom 23, and two side walls 29 opposite to each other and intended to be substantially turned towards the right and towards the left of the vehicle. The side walls 29 each extend from the opening 5 as far as the front wall 25. The receptacle 3 further includes a flange 31 surrounding the opening 5 and protruding outwards from the opening relative to at least the side walls 29 and the upper wall 27. This flange 31 is a supporting span for the door 7 in its closed position.

The door 7 includes a panel 33 intended to close the opening 5, a so-called swan neck arm 35 firmly attached to the panel and intended to cooperate with the lever 21 and a lower arm 37 pivotally mounted around the axis of rotation 11 through the pivot connection 9. The panel 33 has a shape substantially corresponding to that of the opening 5. The arm 35 is firmly attached to the panel 33. It extends towards the front of the vehicle from the panel 33 and is engaged through an orifice 39 made in a portion of the flange 31 adjacent to a side wall 29 of the receptacle. The arm 35 is typically in a plane substantially perpendicular to the axis of rotation 11. The lower arm 37 is itself also firmly attached to the panel 33. It extends this panel downwards and towards the front of the vehicle. Typically, the panel 7 is made by molding plastic material.

The pivot connection 9 attaches the door 7 to a lower portion of the receptacle 3. The axis of rotation 11 is substantially horizontal and transverse.

The impeding member 13 is a retarder of a known type. The glove box includes a pivot connection 41 of the body 15 to an upper area of the receptacle 3. This permits pivoting of the body relative to the receptacle. The pivot has a substantially transverse axis. Its axis is substantially parallel to the axis of rotation 11. The pivot connection 41 attaches the body 15 to an area of the side wall 29 which is adjacent to the upper wall 27. This area where the body is mounted is relatively closer to the opening 5 than to the front wall 25.

In a known manner, the body 15 interiorly delimits a closed chamber into which the head of the piston 17 is engaged. The piston 17 is mobile relatively to the body 15, so that the head of the piston slides inside said chamber along a longitudinal direction. When the piston 17 moves in the direction of sinking into the inside of the body 15, the resistance to the movement of the piston is reduced so that the impeding member opposes a small resistance to the displacement of the door relatively to the receptacle. On the contrary, when the piston 17 moves longitudinally in the direction of a deployment out of the body 15, the movement of the piston is slowed down by strong resistance. This resistance results from the passage of a fluid filling said chamber through a calibrated orifice made in the head of the piston. The piston moves from its sunken position in the body 15 to its deployed position by a movement substantially towards the front wall 25 and downwards.

The connecting link 19 includes a lever 21 and a pivot or journal connection 43 of the lever 21 to the receptacle 3 around a second axis of rotation 45. The second axis of rotation 45 is substantially parallel to the first axis of rotation 11. It is substantially horizontal and transverse. The connection 43 attaches the lever 21 to the side wall 29 of the receptacle. The second axis of rotation 45 is shifted upwards and towards the opening 5 relatively to the first axis of rotation 11. Moreover, the link 19 further includes first and second connecting points 47 and 49 of the lever 21 to the door 7 and to the piston 17, respectively.

The first connecting point 47 directly attaches the lever 21 to the door 7. More specifically, it directly connects the lever 21 to the arm 35. The first connecting point 47 includes an oblong hole or slot 51 made in the lever 21 and a lug 53 carried by the arm 35. The lug 53 is engaged so as to slide freely and pivotally into the slot 51. The lug 53 protrudes relative to the arm 35 substantially horizontally and sideways, i.e. parallel to the first and second axes of rotation 11 and 45.

The second connecting point 49 forms a pivot connection between the piston 17 and the lever 21, around a substantially horizontal and transverse axis, i.e. parallel to the first and second axes of rotation 11 and 45.

The lever 21 is typically bent (angled). It includes a first branch 55 and a second branch 57 connected together through a bend 59. The pivot connection 43 connects the bend 59 to the receptacle 3. The first branch 55 is substantially rectilinear and has an end opposite to the bend 59 in which the slot 51 is made.

The end of the second branch 57 opposite to the bend 59 is bound to the piston 17 through the second connecting point 49. The branch 57 for example includes two sections: a first section 61 connected to the strongly inclined bend 59 relatively to the first branch 55, extended with a second section 63 bound to the piston 17 and slightly inclined relatively to the first branch 55.

The operation of the glove box is the following.

In the initial situation, corresponding to FIG. 1, the door 7 is in the position for covering the opening 5 of the receptacle 3. The piston 17 is in its sunken position inside the body 15 of the impeding member 13.

When a user intends to access the contents of the receptacle, he/she unlocks the door by activating a means suitable for this purpose. The means for example retracts a lock 65 (FIG. 1) engaged into an orifice 67 of the side wall of the receptacle.

Under the effect of its own weight, or of the traction exerted by the user, the door pivots rearwards and downwards around the axis of rotation 11. The arm 35 and the first connecting point 47 move with the door in rotation around the axis 11. The first connecting point 47 is driven into rotation around the pivot axis 11, in the counter-clockwise direction in the illustration of FIG. 1.

The lever 21 is in turn driven to rotation around the second axis of rotation 45, via the first connecting point 47. It describes a rotation relative to the receptacle around the axis of rotation 45, in the clockwise direction in the illustration of FIG. 1.

Because of the rotation of the door and of the rotation of the lever, the lug 53 translationally and rotationally moves inside the slot 51.

The displacement in rotation of the lever 21 around the axis of rotation 45 causes the second connecting point 49 to rotate around this same axis. The second connecting point 49 in turn drives the displacement of the piston 17 relatively to the body 15 of the impeding member.

The pivoting of the second connecting point around the axis of rotation 45 causes translation of the piston 17 relatively to the body 15 from its sunken position towards its deployed position, this position being illustrated in FIG. 2. This movement is accompanied by pivoting of the body 15 relatively to the receptacle 3 around the pivot connection 41.

The movement of the piston 17 relatively to the body 15 is impeded by internal resistance of the impeding member 13, and is thus slowed down, so that the displacement of the door from its closed position to its open position is also itself slowed down.

It should be noted that during the short period following the moment when the piston 17 leaves its sunken position, this piston is not slowed down. This period corresponds to the time required for establishing a seal between the gasket borne by the head of the piston 17 and the wall of the chamber inside which the head of the piston moves. Once the seal is established, the fluid contained in the cavity is forced to pass through a calibrated orifice when the head of the piston moves in the cavity, which produces the retarding effect. The absence of initial retarding is not experienced from any accelerated displacement of the door when the latter leaves its closed position, because of the shape of the slot 51 and of the shape of the lever 21.

Another advantage of the disclosed embodiment consists in the fact that the body 15 and the piston 17 do not protrude at all rearwards relatively to the front wall 25 of the receptacle. In the sunken position of the piston 17, the impeding member is entirely located facing the side wall 29 of the receptacle. Thus, upon mounting the glove box on the dashboard, the risk of damaging the impeding member is considerably reduced. Indeed, this mounting is carried out according to a movement from rear to front. During this movement, if the impeding member protrudes relatively to the wall 25 of the receptacle, an impact may occur between the impeding member and an element of the dashboard if the movement of the glove box is not well under control.

The above-described embodiment of the interior structure includes a single impeding member. However, it is possible that the structure include two impeding members positioned laterally on either side of the receptacle. In this case, the door may include two arms themselves also positioned on either side of the receptacle, each arm being attached to an impeding member through a lever as described above. It will be noted that the respective rotary movements of the connecting points during the displacement of the door are inverted on either side of the receptacle.

The invention claimed is:

1. A motor vehicle interior structure, the structure comprising:
   a receptacle for storing accessories, the receptacle having an opening provided for depositing said accessories into the receptacle or withdrawing said accessories from the receptacle;
   a door for covering the opening;
   said door being pivotally connected to the receptacle at a first axis of rotation such that the door moves relative to the receptacle between a position that covers the opening and a position that provides access to the receptacle through the opening;
   a member that impedes movement of the door, the member including a body connected to the receptacle and a piston extending into the body and movable relative to the body;
   wherein the structure comprises a link interconnecting the piston and the door, the link including a lever pivotally mounted on the receptacle for movement around a second axis of rotation and being connected by first and second connecting points to the door and to the piston respectively, the first and second connecting points being located relative to the second axis of rotation so that movement of the first connecting point around the first axis of rotation in a first rotary direction drives the second connecting point into rotation around the second axis of rotation in a second rotary direction opposite from the first rotary direction.

2. The structure according to claim 1, characterized in that the impeding member is provided for impeding the displacement of the door from a closed position to an open position, this displacement being a downward rotation around the first axis of rotation.

3. The structure according to claim 1, characterized in that the first connecting point includes a slot into which a pivot is engaged so as to slide freely.

4. The structure according to claim 1, characterized in that the lever has first and second ends connected to the door and to the piston through the first and second connecting points respectively, the lever being connected to the receptacle through an intermediate central area between the first and second ends.

5. The structure according to claim 4, characterized in that the lever is bent.

6. The structure according to claim 1, characterized in that the receptacle includes a front wall opposite to the opening, and at least one side wall extending from the opening as far as the front wall, the body being attached to an area of the side wall closer to the opening than to the front wall.

7. A motor vehicle dashboard comprising the structure according to claim 1 incorporated into the motor vehicle dashboard.

8. A motor vehicle comprising the structure according to claim 1 incorporated into the motor vehicle.

9. The vehicle according to claim 8, characterized in that the piston is movable relative to the body between a sunken position in the body and a deployed position out of the body, the piston moving from the sunken position to the deployed position according to a movement towards the front of the vehicle.

10. The vehicle according to claim 9, characterized in that the piston in the sunken position in the body is entirely facing a side wall of the receptacle and does not protrude beyond a front wall of the receptacle turned towards the front of the vehicle.

11. A motor vehicle interior structure according to claim 1, wherein the body is pivotally mounted on an upper area of the receptacle.

12. A motor vehicle interior structure according to claim 1, wherein the body interiorly delimits a closed chamber into which a head of the piston is engaged, a fluid filling said chamber, a calibrated orifice made in the head of the piston, so that when the piston moves longitudinally in the direction of a deployment out of the body, the movement of the piston is slowed down by the passage of the fluid filling said chamber through the calibrated orifice.

* * * * *